Figure 1:
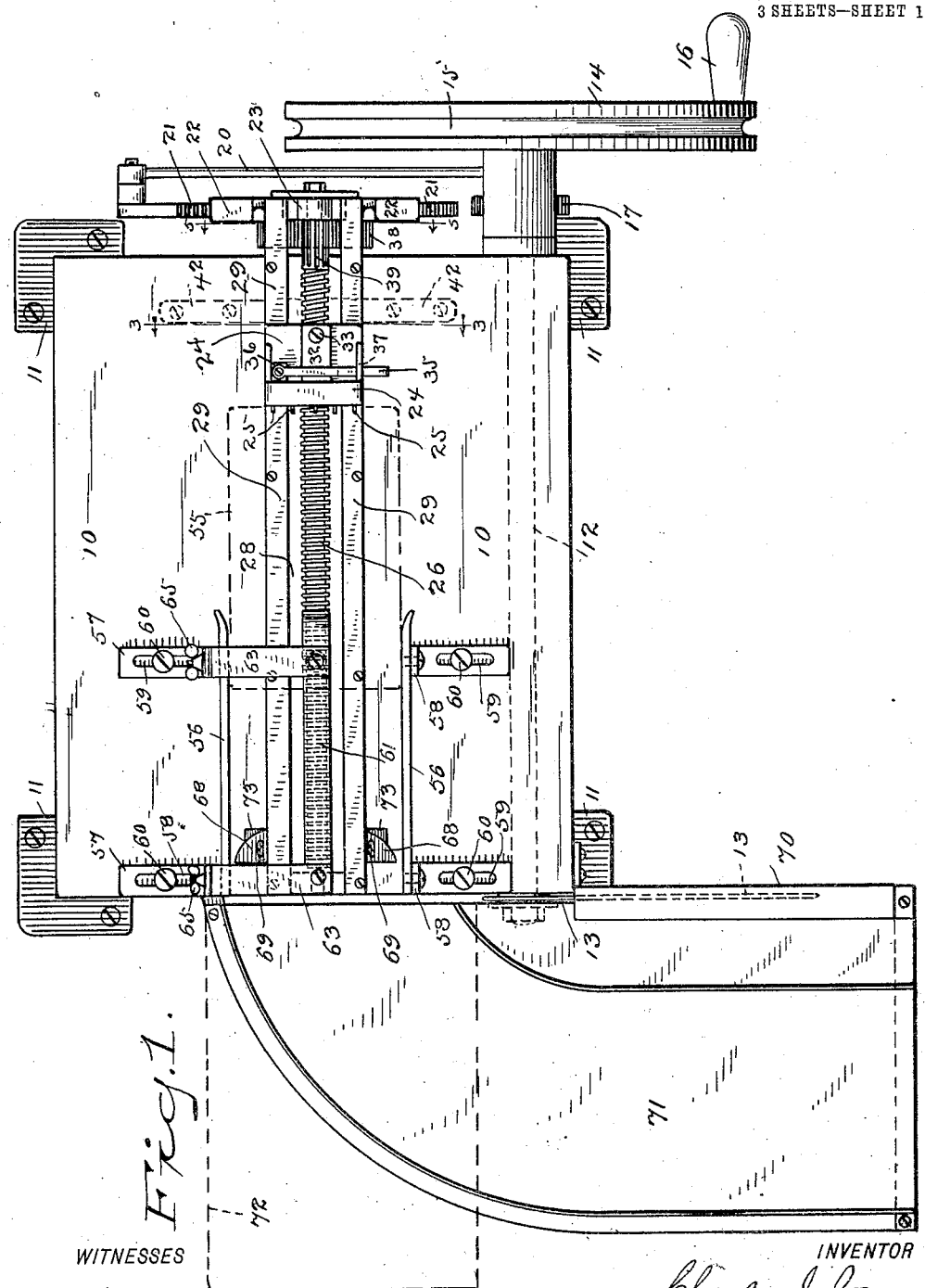

No. 857,913. PATENTED JUNE 25, 1907.
C. J. VANN.
BREAD, MEAT, AND VEGETABLE CUTTING MACHINE.
APPLICATION FILED MAY 2, 1906.

3 SHEETS—SHEET 1.

WITNESSES
H. A. Lamb.
S. W. Atherton.

INVENTOR
Charles J. Vann
BY
A. W. Wooster
ATTORNEY

No. 857,913. PATENTED JUNE 25, 1907.
C. J. VANN.
BREAD, MEAT, AND VEGETABLE CUTTING MACHINE.
APPLICATION FILED MAY 2, 1906.
3 SHEETS—SHEET 2.
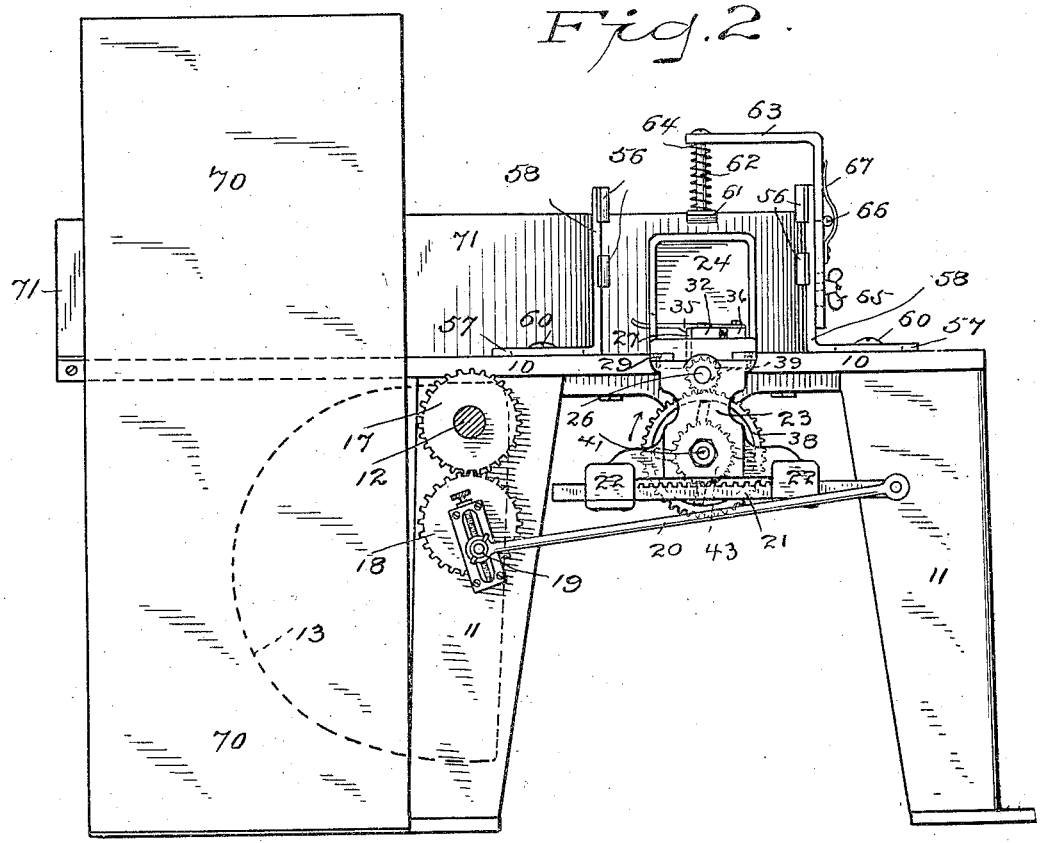

No. 857,913. PATENTED JUNE 25, 1907.
C. J. VANN.
BREAD, MEAT, AND VEGETABLE CUTTING MACHINE.
APPLICATION FILED MAY 2, 1906.

3 SHEETS—SHEET 3.

WITNESSES
H. A. Lamb
S. W. Atherton

INVENTOR
Charles J. Vann
BY
A. M. Wooster
ATTORNEY

UNITED STATES PATENT OFFICE.

CHARLES J. VANN, OF BROOKLYN, NEW YORK.

BREAD, MEAT, AND VEGETABLE CUTTING MACHINE.

No. 857,913.         Specification of Letters Patent.         Patented June 25, 1907.

Application filed May 2, 1906. Serial No. 314,761.

*To all whom it may concern:*

Be it known that I, CHARLES J. VANN, a citizen of the United States, residing at Brooklyn, county of Kings, State of New York, have invented a new and useful Bread, Meat, and Vegetable Cutting Machine, of which the following is a specification.

This invention relates to the class of machines for slicing bread, meat and vegetables, illustrated and described in my former Letters Patent No. 713,539, dated November 11, 1902, and has for its object to simplify and cheapen the construction and to greatly improve the operation of the machine in use, the present invention being, in brief, a carrying forward and perfection of the machine illustrated in my said former patent.

Figure 5:
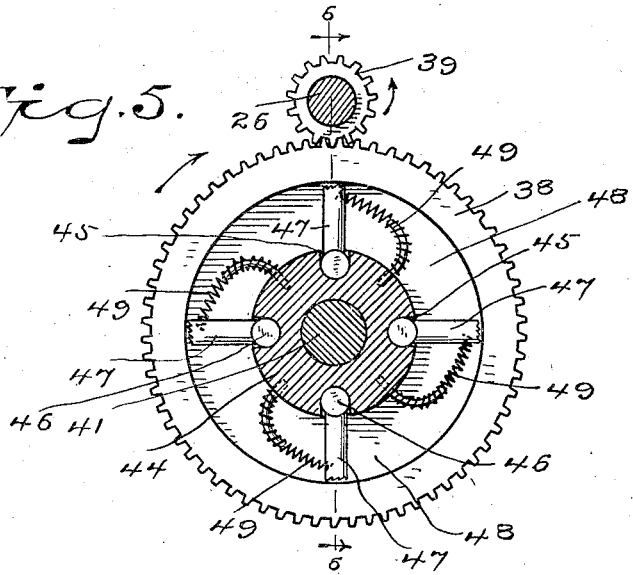
Figure 6:
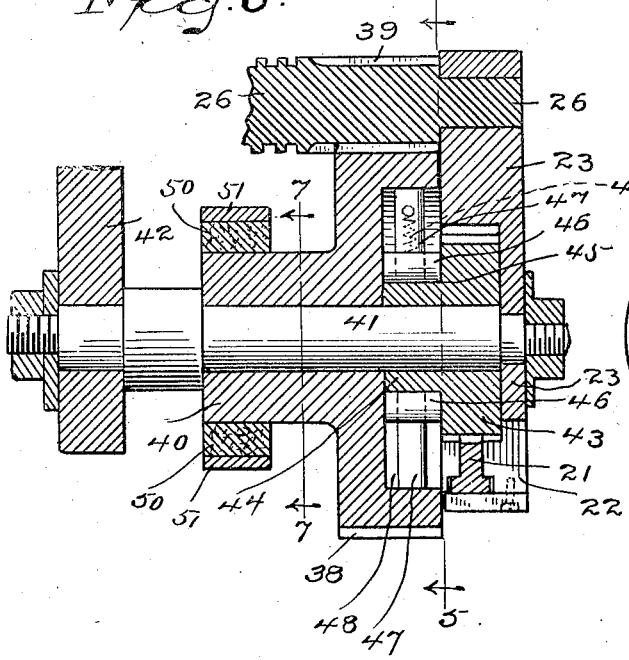
Figure 7:
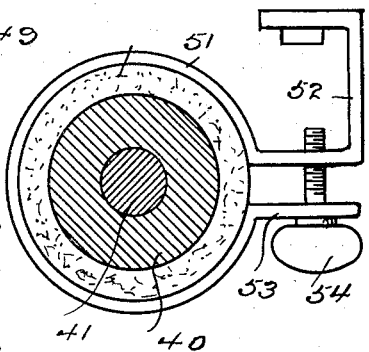

With these ends in view I have devised the novel machine, of which the following description in connection with the accompanying drawings is a specification, reference characters being used to indicate the several parts:

Figure 1 is a plan view of the machine complete; Fig. 2 an end elevation as seen from the right in Fig. 1, the operating wheel being removed; Fig. 3 a section on an enlarged scale on the line 3—3 in Fig. 1 looking toward the left; Fig. 4 a section on the line 4—4 in Fig. 3 looking down; Fig. 5 a section on the line 5—5 in Fig. 6 looking toward the left, the clutch mechanism appearing in elevation; Fig. 6 a section on the line 6—6 in Fig. 5 looking toward the right; and Fig. 7 is a section on the line 7—7 in Fig. 6 looking toward the left, showing the friction device in elevation.

10 denotes the bed of the machine shown as supported by legs 11, and 12 the shaft which extends longitudinally of the machine and is journaled under the bed, in the present instance in two of the legs. This shaft carries at one end a cutting knife 13 having an eccentric cutting edge as shown by dotted lines in Fig. 2, said shaft having at the other end an operating wheel 14 which is shown as provided with a groove 15 and with a crank handle 16 so that the machine may be operated either by hand or by power, as preferred, the operating wheel serving also as a balance wheel.

17 denotes a gear wheel on the shaft 12 which meshes with a corresponding gear wheel 18 mounted to rotate on a stud, not shown, extending from one of the legs. Gear wheel 18 carries an adjustable crank pin 19.

20 denotes a rod one end of which is pivoted to crank pin 19 and the other to a rack 21 which reciprocates in ways 22 upon a bracket 23 which depends from the bed.

For convenience in describing the machine I shall refer to it as a bread cutting machine and describe that use only, although it is obvious that the machine is equally applicable to the slicing of ham, dried beef and other meats and also to the slicing of cabbages and vegetables generally. The loaf of bread to be sliced rests upon the bed, is moved forward by means of a pusher 24 and is retained in place by means of forwardly extending prongs 25 on the pusher. The bread rests upon a fixed support in the sense that it has no lateral movement, but only an advancing movement toward the eccentric knife. The forward movement of the pusher and the feeding of the loaf is effected by means of a worm 26, one end of which is journaled in bracket 23, the other end being journaled in a bracket, not shown, under the forward end of the bed. The pusher is detachably connected with the worm by means of a swinging bar 27 which is ribbed to correspond with the worm and projects through a slot 28 in the bed.

29 denotes longitudinal plates, secured to the bed on opposite sides of the slot and extending partly over the slot, which form ways for the pusher, and 30 plates secured to the underside of the pusher and lying under plates 29. Recesses 31 in the underside of the pusher receive plates 29 and form with plates 30 grooves which receive the ways. The swinging ribbed bar 27 is formed integral with or rigidly secured to a plate 32 which is pivoted to the rear end of the pusher as at 33. A spring 34 upon the pusher bears against plate 32 and normally acts to swing the plate around and carry the ribbed bar out of engagement with the worm. The ribbed bar is retained in engagement with the worm by means of a spring latch 35 shown as pivoted to a block 36 on the pusher and engaging the plate, as clearly shown in Fig. 3. The free end of the latch projects through a slot 37 in the pusher, shown by dotted lines only in Fig. 3, for convenience in operation.

Intermittent rotation is imparted to the worm 26 by means of clutch mechanism which I will now describe.

38 denotes a gear wheel which engages a pinion 39 at the end of the worm and is provided with a hub 40. This gear wheel is mounted to rotate on a shaft 41, one end of which is fixed in bracket 23 and the other in a bracket 42 which depends from the bed.

43 denotes a gear wheel having a hub 44 which is mounted to rotate on shaft 41 and engages rack 21. Hub 44 is provided with sockets 45 which receive the hubs 46 of clutch dogs 47. Hub 44 and the clutch dogs lie in a recess 48 in the face of gear wheel 38 and the engaging ends of the clutch dogs are normally held in engagement with the periphery of the recess by springs 49, see Fig. 5. Gear wheel 38 is held against backward movement by means of a friction device comprising a friction ring 50 which incloses hub 44 and a clamping ring 51 which incloses the friction ring and is provided with an arm 52 shaped to form an attaching bracket and secured to the underside of the bed, and an arm 53. A set screw 54 passing through these arms enables the operator to tighten the clamping ring and close the friction ring upon the hub with just sufficient pressure to retain gear wheel 38 in place after each forward movement and prevent any backward movement of said gear wheel.

The operation of the clutch mechanism will be obvious from Figs. 5, 6 and 7, in connection with which see Fig. 2.

Each reciprocation of the rack by means of rod 20 will cause an oscillation of gear wheel 43 in each direction. When the rack is moved toward the left, as seen in Fig. 2, gear wheel 43 and hub 44 will be turned toward the right, as seen in Fig. 5, and the clutch dogs will engage the inner periphery of recess 48 in gear wheel 38 and will turn said gear wheel also toward the right and by means of pinion 39 will turn the worm and impart an actuation to the pusher. When the rack is moved toward the right, as seen in Fig. 2, gear wheel 43 and hub 44 will be turned toward the left, as seen in Fig. 5, springs 49 will yield and the clutch dogs will be dragged backward over the inner periphery of recess 48 in gear wheel 38 without imparting movement to said gear wheel which will be held stationary by means of the friction device.

55, see dotted lines Fig. 1, indicates a loaf of bread as it is placed in the machine.

56 denotes side guides for the loaf, preferably two on each side. Each pair of side guides is carried by slides 57 provided with upwardly extending arms 58 to which the side guides are attached. The slides are provided with slots 59 and are secured to the bed by means of screws 60 passing through the slots.

61 denotes a top guide for the loaf carried by rods 62 which extend upward and pass loosely through arms 63, (see Fig. 2.) These arms extend outward and downward and are adjustably secured to arms 58 on the slides 57 at one side of the machine, the right as seen in Fig. 2, by means of set screws 65 which pass through slots in arms 63 and engage arms 58. The top guide is retained in engagement with the top of the loaf by means of springs 64 which inclose rods 62, the springs yielding and allowing the top guide and rods to move upward to provide for inequalities in the height of the loaf. In order that the top guide may be swung upward and out of the way if required, I preferably provide hinge joints 66 in arms 63 and retain the upper portions of said arms and the top guide in operative position by means of springs 67 which are secured to the lower portions of said arms and the free ends of which bear upon the upper portions thereof, as clearly shown in Fig. 2.

68 denotes trimming knives which may or may not be used, as preferred, to trim off the sides of a loaf of bread as it is pushed forward. The bases of these trimming knives are shown as socketed in recesses 73 in the bed and the knives are secured to the bed by means of screws 69.

The cutting or slicing of the bread is effected by means of the rotary eccentric cutting knife 13 carried by shaft 12, substantially as in my said former patent referred to.

70 denotes a guard for the cutting knife, the normal position of which is indicated by dotted lines in Fig. 2.

71 denotes a receiving trough preferably curved, as shown in Fig. 1, into which the slices pass as they are cut from the loaf, the feeding forward of the loaf acting to force the severed slices forward in the trough.

72, see dotted lines in Fig. 1, indicates a table which may be secured to the forward end of the bed and used in cutting meat and vegetables, the trough being of course removed and the table being secured to the bed by screws or in any suitable manner not illustrated in the drawings.

The operation of the machine as a whole will be readily understood from the drawings.

The thickness of the slices to be cut is determined by the adjustment of crank pin 19, to which rod 20 is pivoted, on gear wheel 18. As soon as the cutting up of a loaf has been finished, the operator disengages latch 35 from block 36 and spring 34 will swing the block around and move the ribbed bar out of engagement with the worm. The operator then moves the pusher back to the starting position and places a new loaf before it, the loaf being engaged by prongs 25 and the forward end of the loaf lying between the side guides and under the top guide. Having placed the new loaf in position and swung the ribbed bar into engagement with the worm where it is locked by engagement of the latch with plate 32, the operating wheel is rotated either by hand or power as preferred, the new loaf is pushed forward, trimmed by the trimming knives if required and cut into slices. The rotation of the cutting knife is continuous. At the time the cutting operation is performed, the worm and pusher are stationary, but as soon as the cutting knife has passed through the loaf the worm is again turned and the pusher is actuated to move the loaf forward a distance equal to the thickness of another slice before the cutting knife reaches the cutting position and commences the cutting operation. As soon as a loaf is sliced, the ribbed bar is disengaged from the worm by lifting the latch and the pusher is moved back to place as before.

Having thus described my invention I claim:

1. A machine of the character described comprising a cutting knife, a pusher for feeding the material to the knife, a worm, a detachable connection intermediate the pusher and the worm, a reciprocating rack and connections intermediate the rack and the worm whereby the latter is intermittently rotated.

2. A machine of the character described comprising a cutting knife, a pusher for feeding the material to the knife, a worm, connections intermediate the pusher and the worm, a reciprocating rack, connections for intermittently actuating the worm by the rack, and means for adjusting the throw of the rack, substantially as described, for the purpose specified.

3. A machine of the character described comprising a cutting knife, a pusher for feeding the material to the knife, a worm, a detachable connection intermediate the pusher and the worm, a rack, connections for intermittently actuating the worm by the rack, a rod connected to the rack and a shaft having an adjustable crank pin on which the rod is pivoted whereby the throw of the rack may be adjusted to regulate the movement of the pusher at each actuation.

4. In a machine of the character described the combination with a cutting knife, a pusher for feeding the material to the knife, a worm, a pinion carried thereby, a gear wheel 38 engaging said pinion and having a recess 48 in its face and a gear wheel 43 having a hub 44, of clutch dogs which engage the inner periphery of recess 48 and are provided with hubs socketed in hub 44, springs acting to normally hold said clutch dogs in operative engagement and a reciprocating rack engaging gear wheel 43, said clutch dogs acting when the rack is moved in one direction to carry gear wheel 38 forward and rotate the worm and moving backward over the inner periphery of recess 48 leaving said gear wheel stationary when the rack is moved in the opposite direction.

5. In a machine of the character described, the combination with a cutting knife, a pusher for feeding the material to the knife, a worm, a pinion carried thereby, a gear wheel 38 engaging said pinion and having a recess in its face, and a gear wheel 43 having a hub 44, of clutch dogs socketed in hub 44 and engaging the inner periphery of the recess, springs acting to normally hold said clutch dogs in operative engagement and means for imparting intermittent rotation to gear wheel 43.

6. In a machine of the character described, the combination with a cutting knife, a pusher for feeding the material to the knife, a worm, a pinion carried thereby, a gear wheel 38 engaging said pinion and having a recess in its face and a hub 40, and a gear wheel 43 having a hub 44, of clutch dogs which engage the wall of the recess and are provided with hubs socketed in hub 44, springs acting to normally hold said clutch dogs in operative engagement, a reciprocating rack engaging gear wheel 43, for the purpose set forth, and a friction device on hub 40 whereby gear wheel 38 is held against backward movement.

7. In a machine of the character described, the combination with a cutting knife, a pusher for feeding the material to the knife, a worm, a pinion carried thereby, a gear wheel 38 engaging said pinion and having a recess in its face and a hub 40, and a gear wheel 43 having a hub 44, of clutch dogs which engage the wall of the recess and are socketed in hub 44, springs acting to normally hold the clutch dogs in operative engagement, means for imparting intermittent rotation to gear wheel 43, and a friction device whereby gear wheel 38 is held against backward movement.

8. In a machine of the character described, the combination with a cutting knife, a pusher for feeding the material to the knife, a worm, a pinion carried thereby and a gear wheel engaging said pinion and having a hub, of mechanism for imparting intermittent movement to said gear wheel and worm and a friction ring and clamping ring inclosing said hub whereby the gear wheel is held against backward movement.

9. In a machine of the character described the combination with a shaft, a cutter carried thereby, a pusher, a worm and detachable connections intermediate the pusher and the worm, of a rack and connections intermediate the shaft and the rack whereby the latter is reciprocated and connections intermediate the rack and the worm for imparting intermittent rotation to the latter.

10. In a machine of the character described, a bed having a central, longitudinal slot; a shaft; a worm located beneath the slot in the bed; a connection between said shaft and worm whereby an intermittent rotation is imparted to the worm; a pusher slidingly mounted within the slot; a plate pivoted to said pusher; a bar depending from said plate through the slot in the bed and adapted to engage with the worm; means for normally holding the said plate in a position to cause the bar to engage with the worm, and a spring exerting pressure against the plate tending to cause it to swing to a position where the depending bar will be disengaged from the worm.

11. In a machine of the character described, a bed provided with a central, longitudinal slot; plates secured to the edges of said slot; a shaft; a worm; connections between the shaft and worm whereby an intermittent rotation may be imparted to the worm; a pusher; plates secured to the underside of the pusher and extending under the plates of the slot; a plate pivoted to the rear of said pusher; a bar depending from said pivoted plate through the bed slot, the lower end of said bar being ribbed to correspond with the worm; a spring latch for normally retaining the pivoted plate in a position where the depending bar will be in engagement with the said worm, and a spring acting against the said pivoted plate to cause it to move to a position where the depending bar will be disengaged from the worm.

12. In a machine of the character described, a shaft; a worm; connections between the shaft and worm whereby an intermittent rotation may be imparted to the worm; a pusher; connections between the pusher and the worm whereby the pusher may be reciprocated; side guides for the material to be sliced; and top guides comprising a slide secured to the bed of the table the inner end of which is provided with a vertically extending portion; a vertical rod adjustably connected with the vertical portion of the slide and being provided with a central spring hinged portion; a horizontal portion extending from the said vertical rod, and a spring actuated rod extending through said horizontal portion and carrying a guide adapted to press upon the material to be sliced.

In testimony whereof I affix my signature, in presence of two witnesses.

CHARLES J. VANN.

Witnesses:
  A. M. WOOSTER,
  S. W. ATHERTON.